United States Patent [19]

Yano

[11] Patent Number: 4,919,401
[45] Date of Patent: Apr. 24, 1990

[54] FLUID-FILLED BUSHING HAVING RADIALLY DISPLACEABLE INTERMEDIATE SLEEVE COATED WITH SEALING RUBBER LAYER

[75] Inventor: Katsuhisa Yano, Inuyama, Japan

[73] Assignee: Tokai Rubber Industries, Ltd., Japan

[21] Appl. No.: 305,084

[22] Filed: Feb. 2, 1989

[30] Foreign Application Priority Data

Feb. 8, 1988 [JP] Japan ............................. 63-15424[U]

[51] Int. Cl.⁵ ............................ F16F 5/00; F16M 5/00
[52] U.S. Cl. ................................ 267/140.1; 267/140.2
[58] Field of Search ................... 267/219, 140.1, 140.2, 267/141.2, 276, 281, 293, 140.1 C, 35; 180/300, 312; 248/562, 636, 638, 575

[56] References Cited

FOREIGN PATENT DOCUMENTS

| | | | |
|---|---|---|---|
| 0020790 | 1/1981 | European Pat. Off. | 267/141.2 |
| 0170609 | 10/1983 | Japan | 267/140.1 |
| 10138 | 1/1986 | Japan . | |

*Primary Examiner*—Robert J. Oberleitner
*Attorney, Agent, or Firm*—Oliff & Berridge

[57] ABSTRACT

A fluid-filled elastic bushing, including an inner sleeve, an intermediate sleeve disposed radially outwardly of the inner sleeve, an elastic body connecting the inner sleeve and intermediate sleeves, and an outer sleeve fitted on the intermediate sleeve so as to close pockets which are formed in the elastic body and exposed through windows formed in the intermediate sleeve. The pockets and the outer sleeve define fluid chambers which communicate with each other through an orifice passage. A sealing rubber layer is formed on an outer surface of the intermediate sleeve, and the intermediate sleeve has at least one axial slot formed therethrough so as to extend in its axial direction over the entire axial length. The elastic body has an axial cutout formed in its outer surface so as to extend in its axial direction over the entire length, in aligned relation with each axial slot in the intermediate sleeve. The intermediate sleeve is radially inwardly deformed or displaced by a force applied by the outer sleeve, whereby the elastic body is radially inwardly pre-compressed.

5 Claims, 3 Drawing Sheets

FLUID-FILLED BUSHING HAVING RADIALLY DISPLACEABLE INTERMEDIATE SLEEVE COATED WITH SEALING RUBBER LAYER

BACKGROUND OF THE INVENTION

1. Field of the Invention

The present invention relates generally to a fluid-filled cylindrical elastic bushing adapted for damping and isolating primarily a vibrational load applied in its radial direction, and more particularly to improvements in such a fluid-filled elastic bushing which is easy to manufacture, with desired pre-compression of an elastic body and sealing of fluid chambers.

2. Discussion of the Prior Art

A cylindrically bushing adapted to damp and isolate primarily vibrations applied in its radial direction is known as a flexible connector or cushioning device interposed between members of a vibration system, for example, as a suspension bushing for connecting various arms and rods in a suspension system of an automotive vehicle.

A so-called fluid-filled elastic bushing has been widely used as such a cylindrical bushing. An example of a fluid-filled elastic bushing is disclosed in laid-open Publication No. 61-10138 of unexamined Japanese Patent Application, whereby the bushing includes an inner sleeve, an intermediate sleeve which is disposed radially outwardly of and coaxially with the inner sleeve, an elastic body which connects the inner and intermediate sleeves and has a plurality of pockets that are exposed through a corresponding plurality of windows formed through the intermediate sleeve, an outer sleeve which is fitted on the intermediate sleeve and closes the pockets in the elastic body, so as to define a plurality of fluid chambers which are filled with a non-compressible fluid and whose volumes are variable in response to a vibrational load applied between the inner and outer sleeves, and an orifice passage for fluid communication between the fluid chambers.

In the fluid-filled elastic bushing of the type as described above, vibrations having frequencies to which the orifice passage is tuned may be excellently damped and isolated, based on restricted flows of the fluid between the fluid chambers through the orifice passage, or based on resonance of the fluid masses in the bushing.

In the art of manufacturing such a fluid-filled elastic bushing, a unitary intermediate product is prepared in a vulcanization process, such that the elastic rubber body is secured by vulcanization of a rubber material, to the outer surface of the inner sleeve and the inner surface of the intermediate sleeve. On the other hand, the fluid chambers are sealed by providing a sealing rubber layer between the outer surface of the intermediate sleeve and the inner surface of the outer sleeve. Where the sealing rubber layer is formed integrally on the outer surface of the intermediate sleeve, the sealing rubber layer tends to be damaged or separated from the intermediate sleeve when the intermediate sleeve is radially inwardly drawn for radially inward pre-compression of the elastic rubber body, which is effected for the purpose of eliminating stresses in the elastic rubber body due to its shrinkage during the vulcanization process, and improving the adhesion of the rubber body to the inner and intermediate sleeves.

For accomplishing the sealing of the fluid chambers and the radially inward pre-compression of the elastic body, the vulcanization of the elastic body and the vulcanization of the sealing rubber layer are conventionally effected in two independent steps. Further, the intermediate sleeve is first radially inwardly drawn for pre-compression of the elastic body, and then the outer sleeve is radially inwardly drawn for securing fluid tightness between the outer and intermediate sleeves, i.e., fluid tightness of the fluid chambers which are defined by the elastic body and the outer sleeve.

SUMMARY OF THE INVENTION

It is accordingly an object of the present invention to provide a fluid-filled elastic bushing which is easy to manufacture, with intended radially inward pre-compression of an elastic body and sealing of fluid chambers.

The above object may be achieved according to the principle of the present invention, which provides a fluid-filled elastic bushing, including (a) an inner sleeve, (b) an intermediate sleeve disposed radially outwardly of and coaxially with the inner sleeve, (c) an elastic body connecting the inner sleeve and the intermediate sleeve and having a plurality of pockets which are exposed through a corresponding plurality of windows formed through the intermediate sleeve, (d) an outer sleeve fitted on the intermediate sleeve and closing the pockets in the elastic body, so as to define a plurality of fluid chambers which are filled with a non-compressible fluid and whose volumes are changed in response to a vibrational load applied between the inner and outer sleeves in a radial direction thereof, and (e) means for defining an orifice passage for fluid communication between the fluid chambers, the elastic bushing being characterized in that: a sealing layer is formed on an outer surface of the intermediate sleeve; that the intermediate sleeve has at least one axial slot formed through its thickness, so as to extend in an axial direction over an entire axial length thereof, in a portion thereof which does not have the pockets, whereby the intermediate sleeve is cut by the at least one axial slot in a circumferential direction thereof; that the elastic body has an axial cutout formed in an outer surface thereof so as to extend in an axial direction thereof over an entire axial length thereof, in aligned relation with each axial slot in the intermediate sleeve, the elastic body having portions for preventing fluid communication between the fluid chambers and the axial cutout; and that the intermediate sleeve is radially inwardly deformed or displaced by a force applied by the outer sleeve, whereby the elastic body is radially inwardly pre-compressed.

In the fluid-filled elastic bushing of the present invention constructed as described above, the inner sleeve, the intermediate sleeve, the elastic body and the sealing rubber layer are formed as a unitary intermediate product prepared by vulcanization of the elastic body such that the sealing rubber layer covers the outer surface of the intermediate sleeve. Thus, the elastic body and the sealing rubber layer are formed in one vulcanization process. After the outer sleeve is mounted on the intermediate product, the outer sleeve is subjected to a suitable drawing operation, by which the sealing rubber layer as well as the elastic body is radially inwardly pre-compressed by a force applied by the outer sleeve. The at least one slot formed in the intermediate sleeve permits the intermediate sleeve to be radially inwardly displaced by the drawing force applied to the outer sleeve. Further, portions of the sealing rubber layer disposed along the cutout or cutouts formed in the elastic body may be elastically displaced toward the cutout or cutouts when the intermediate sleeve is radially inwardly displaced by the force applied by the outer sleeve. Thus, the instant fluid-filled elastic bushing is comparatively easy to assemble, with intended precompression of the elastic body and sealing of the fluid chambers.

It is also significant to note that the intermediate sleeve used in the instant elastic bushing may be readily formed by pressing of a sheet member. This is advantageous for reduced material and manufacturing costs of the elastic bushing.

The plurality of windows may consist of a pair of windows formed in diametrically opposite portions of the intermediate sleeve, while the at least one axial slot may consist of a single axial slot which is disposed intermediate between the pair of windows in the circumferential direction of the intermediate sleeve. In this case, the single axial slot may be positioned about 90 degrees away from the pair of windows in the circumferential direction.

The elastic bushing may preferably comprise a stopper block fixedly mounted on the inner sleeve such that opposite end portions of the stopper block project in the two fluid chambers. The inner sleeve and the stopper block may cooperate with each other to define orifice means for fluid communication between the fluid chambers.

The plurality of windows may be formed in an axially intermediate portion of the intermediate sleeve. The sealing rubber layer may be formed with sealing lips in alignment with axial end portions of the intermediate sleeve.

BRIEF DESCRIPTION OF THE DRAWINGS

The above and optional objects, features and advantages will become more apparent by reading the following detailed description of a presently preferred embodiment of the invention, when considered in connection with the accompanying drawings, in which.

DETAILED DESCRIPTION OF THE PREFERRED EMBODIMENT

Figure 1:
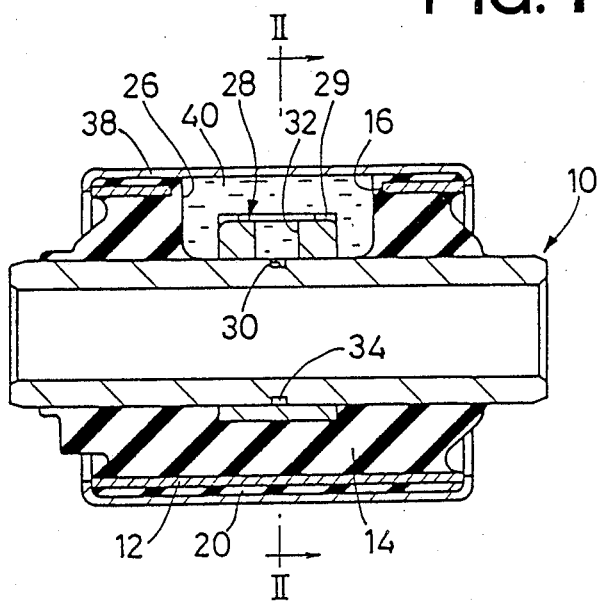
FIG. 1 is an elevational view in axial cross section of one embodiment of a fluid-filled elastic bushing of the present invention, in the form of a suspension bushing for a motor vehicle, the view being taken along line I—I of FIG. 2.
Figure 2:
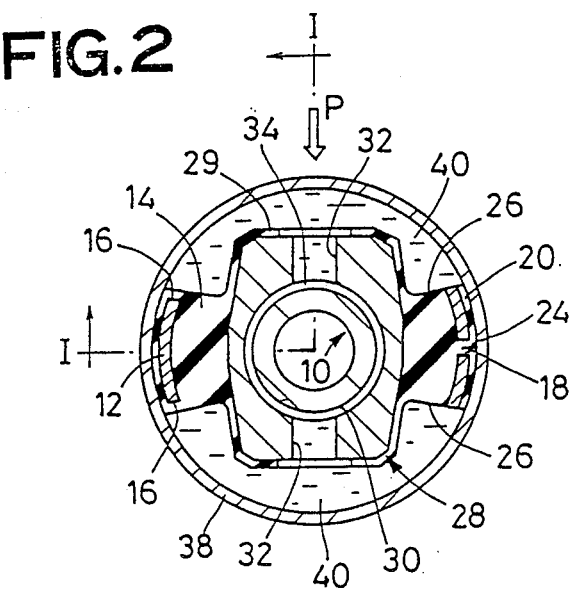
FIG. 2 is an elevational view in transverse cross section taken along line II—II of FIG. 1.

Referring first to FIGS. 1 and 2, there is illustrated a fluid-filled suspension bushing for a motor vehicle, wherein reference numeral 10 denotes an inner metal sleeve which has a relatively large cylindrical wall thickness. Outwardly of this inner sleeve, there is disposed an intermediate sleeve 12 which has a relatively small cylindrical wall thickness. The intermediate sleeve 12 is positioned coaxially with the inner sleeve 10 and spaced a suitable distance from the inner sleeve in the radial direction.

Figure 3:
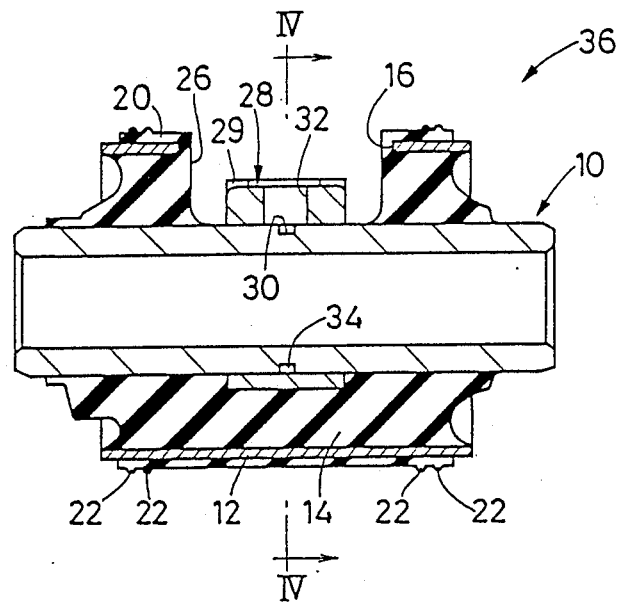
FIG. 3 is an elevational view in axial cross section of an intermediate product prepared in a vulcanization process during manufacture of the elastic bushing, the view being taken along line III—III of FIG. 4.
Figure 4:
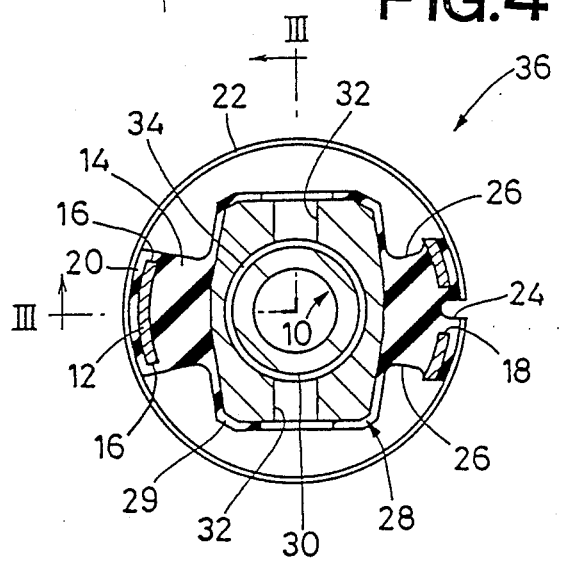
FIG. 4 is an elevational view in transverse cross section taken along line IV—IV of FIG. 3.
Figure 5:
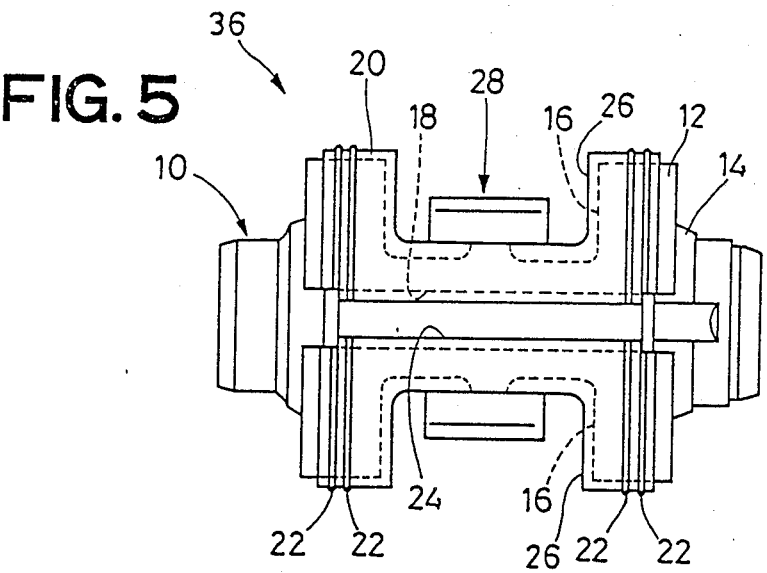
FIG. 5 is a side elevational view of the intermediate product, taken on the right-hand side of FIG. 4.

Between the inner and intermediate sleeves 10, 12, there is formed an elastic rubber body 14 having a generally annular configuration, as also shown in FIGS. 3-5. The rubber body 14 elastically connects the inner and intermediate sleeves 10, 12.

Figure 6:
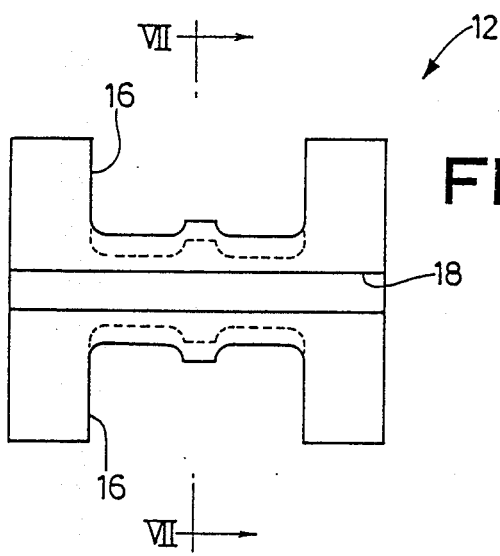
FIG. 6 is a side elevational view of an intermediate sleeve incorporated in the elastic bushing.
Figure 7:
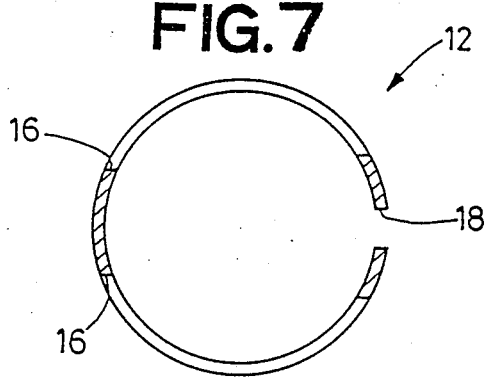
FIG. 7 is a cross sectional view taken along line VII—VII of FIG. 6.

As illustrated in FIGS. 6 and 7, the intermediate sleeve 12 has a pair of substantially rectangular windows 16, 16 formed in axially intermediate portions thereof, which are diametrically opposite to each other. The intermediate sleeve 12 further has an axial slot 18 formed in its axial direction over its entire axial length, in a portion thereof which is spaced 90 degrees from the centers of the windows 16 in the circumferential direction. That is, the axial slot 18 is positioned intermediate between the windows 16 circumferentially of the sleeve 12, in one of two circumferential portions thereof which are opposite to each other in a diametric direction which is perpendicular to the diametric direction in which the two windows 16 are opposite to each other. The axial slot 18 has a suitable width, and disconnects the circumferential wall of the intermediate sleeve 12.

The outer surface of the intermediate sleeve 12 is substantially entirely coated with a sealing rubber layer 20 which is formed integrally with the elastic rubber body 14. The sealing rubber layer 20 has two circumferential sealing lips 22 formed at each axial end portion, as indicated in FIG. 3.

The elastic rubber body 14 has an axial cutout or groove 24 formed in its axial direction, in a circumferential portion thereof aligned with the axial slot 18 of the intermediate sleeve 12. The axial cutout 24 is formed over the entire axial length of the rubber body 14 and has a width substantially equal to that of the axial slot 18.

The elastic rubber body 14 has a pair of pockets 26 formed in axially intermediate, diametrically opposite circumferential portions which are circumferentially spaced 90 degrees from the axial cutout 24. Namely, the diametrically opposite pockets 26 are aligned with the two windows 16 formed in the intermediate sleeve 12. In the intermediate product 36 of FIG. 3, the pockets 26 are exposed through the windows 16, as indicated in the same figure.

The inner sleeve 10 is provided with a generally elongate rectangular stopper block 28 fitted on an axially intermediate portion thereof. The opposite longitudinal end portions project in the pockets 26 by a suitable distance in the opposite radial directions. The surfaces of the stopper block 28 exposed to the pockets 26 are covered by respective thin cushioning layers 29 formed as integral parts of the elastic rubber block 28.

The axially intermediate portion of the inner sleeve 10 on which the stopper block 28 is mounted has a circumferential groove 30 formed in its outer circumferential surface. The groove 30 is closed by the inner circumferential surface of the stopper block 28, whereby a circumferential passage is formed. This passage is held in communication with the pockets 26, through two communication holes 32, 32 formed through the stopper block 28 in the opposite radial directions. Thus, the circumferential groove 30 and the communication holes 32 cooperate with each other to define an orifice passage communicating with the two pockets 26.

The intermediate product 36 is prepared in a vulcanization mold in which the inner sleeve 10 with the stopper block 28, and the intermediate sleeve 12 are positioned relative to each other. An unvulcanized rubber material injected in the mold is vulcanized, whereby the elastic rubber body 14 and the thin sealing rubber layer 20 are integrally formed such that the body 14 and the layer 20 adhere to the inner and intermediate sleeves 10, 12.

On the thus prepared intermediate product 36, there is fitted an outer sleeve 38 which has a relatively small cylindrical wall thickness. The outer sleeve 38 closes the openings of the pockets 26, 26, thereby forming a pair of fluid chambers 40, 40 which communicate with each other through the orifice passage 34 indicated above.

The fluid chambers 40, 40 are filled with a suitable non-compressible fluid such as water and polyalkylene glycol. The filling of the fluid chambers 40 is effected while the outer sleeve 38 and the intermediate product 36 are assembled within a mass of the selected non-compressible fluid.

After the fluid chambers 40 are filled with the non-compressible fluid with the outer sleeve 38 fitted on the intermediate product 36, the outer sleeve 38 is subjected to a suitable drawing operation, which is performed, for example, by using eight drawing dies disposed around the outer sleeve 38. Further, the axially end portions of the outer sleeve 38 are roll-caulked to the intermediate product 36. Thus, the instant fluid-filled elastic suspension bushing is produced.

The suspension bushing is installed on a motor vehicle. For instance, the suspension bushing is mounted such that a mounting shaft fixed to the body of the vehicle is inserted through the inner sleeve 10, while the outer sleeve 38 is fitted within a cylindrical holder portion of a suspension member of the vehicle. When a vibrational load is applied to the suspension bushing in a radial direction as indicated at P in FIG. 2, the inner and outer sleeves 10, 38 are radially displaced relative to each other, and the fluid is forced to flow between the two fluid chambers 40, 40 through the orifice passage 34, whereby the input vibrations can be effectively damped or isolated based on the restricted fluid flows through the restricted orifice passage 34 or on resonance of the fluid masses.

It is noted that the intermediate product 36 is also subject to a radially inward compressive force when the outer sleeve 38 is radially inwardly drawn. Since the axial slot 18 is formed through the thickness of the intermediate sleeve 12 over its entire axial length, the intermediate sleeve 12 may be radially inwardly displaced so as to reduce its diameter, with the width of the axial slot 18 reduced.

As a result of the radially inward displacement of the intermediate sleeve 12, the elastic rubber body 14 is effectively radially inwardly pre-compressed, whereby the residual stresses in the rubber body 14 due to its shrinkage during vulcanization are eliminated, and the adhesion of the rubber body 14 to the inner and intermediate sleeves 10, 12 is increased.

Further, the drawing force exerted on the outer sleeve 38 is also applied to the sealing rubber layer 20 formed on the intermediate sleeve 12, whereby the rubber layer 20 is compressed or squeezed between the intermediate and outer sleeves 12, 38. Thus, fluid tightness between these two sleeves 12, 38 is established. In other words, the fluid chambers 40, 40 defined by the rubber block 14 and the outer sleeve 38 may be suitably sealed.

Since the elastic rubber body 14 has the axial cutout 24 aligned with the axial slot 18 in the intermediate sleeve 12, the axial cutout 24 acts as a relief void which accommodates portions of the rubber layer 20 which are forced into the axial slot 18, upon radially inward displacement of the intermediate sleeve 12 when the outer sleeve 38 is subjected to the radially inward drawing operation discussed above. Accordingly, the axial cutout 24 serves to protect the sealing rubber layer 20 against otherwise possible damage or separation from the intermediate sleeve 12. Thus, a high degree of fluid tightness between the intermediate and outer sleeves 12, 38 may be maintained for a prolonged period of time.

It will be understood from the above description that the single drawing operation on the outer sleeve 38 results in the radially inward pre-compression of the rubber body 14, as well as the compression of the sealing rubber sleeve 20. That is, the pre-compression of the rubber body 14 and the sealing of the fluid chambers 40 are effected concurrently, contrary to the conventional procedure wherein the intermediate sleeve is also subjected to a drawing operation. Consequently, the rubber layer 20 is suitably protected against damage or separation, even if the rubber layer 20 is formed on the outer surface of the intermediate sleeve 12. In other words, the sealing rubber layer 20 may be formed as a part of the unitary intermediate product 36, which is integral with the rubber block 14 and which covers the outer surface of the intermediate sleeve 12. Since the intermediate product 36 may be prepared in a single vulcnaization process, the manufacture of the suspension bushing as a whole may be significantly simplified, and the cost of manufacture may be accordingly reduced.

The concurrent pre-compression of the rubber block 14 and the sealing rubber layer 20 further simplifies the manufacture of the instant suspension bushing.

Further, the intermediate sleeve 12 may be easily formed by pressing on a sheet blank, since the intermediate sleeve 12 need not have a continuously cylindrical wall. It is further noted that punching or piercing operations for forming the windows 16 may also be easily performed where the intermediate sleeve 12 is press-formed from a sheet blank. Accordingly, the material and manufacturing costs of the sleeve 12 may be lowered.

While the present invention has been described in its presently preferred embodiment with a certain degree of particularity, for illustrative purpose only, it is to be understood that the invention is by no means confined to the details of the illustrated embodiment, but may be otherwise embodied.

For instance, the intermediate sleeve 12 (which may not be a continuous sleeve) may have a plurality of slots or slits (18) which are spaced apart from each other in the circumferential direction. In this case, the intermediate sleeve consists of a plurality of divisions each having an arcuate transverse cross sectional shape.

While the illustrated embodiment uses the orifice passage 34 formed in the inner sleeve 10 and the stopper block 28, the suspension bushing may use other forms of orifice means for fluid communication between the fluid chambers 40. For instance, the orifice means may be formed in a radially outer portion of the bushing structure.

Although the illustrated embodiment is adapted to be used as a suspension bushing of a motor vehicle, the principle of the present invention is equally applicable to other fluid-filled elastic bushing or cushioning device, such as vehicle member mounts.

It will be understood that the invention may be embodied with various other changes, alterations, modifications and improvements, which may occur to those skilled in the art, without departing from the spirit and scope of the invention defined in the following claims.

What is claimed is:

1. A fluid-filled elastic bushing, including (a) an inner sleeve, (b) an intermediate sleeve disposed radially outwardly of an coaxially with the inner sleeve, (c) an elastic rubber body connecting the inner sleeve and the intermediate sleeve and having a plurality of pockets which are exposed through a corresponding plurality of windows formed through the intermediate sleeve, (d) an outer sleeve fitted on the intermediate sleeve and closing the pockets in the rubber elastic body, so as to define a plurality of fluid chambers which are filled with a non-compressible fluid and whose volumes are changed in response to a vibrational load applied between the inner and outer sleeves in a radial direction thereof; and (e) means for defining an orifice passage for fluid communication between the fluid chambers, wherein the improvement comprises:

the intermediate sleeve having at least one axial slot formed through a thickness thereof so as to extend in an axial direction over an entire axial length thereof, in a portion thereof which does not have said windows, whereby the intermediate sleeve is cut by said at least one axial slot in a circumferential direction thereof;

the elastic rubber body having an axial cutout formed in an outer surface thereof so as to extend in an axial direction thereof over an entire axial length thereof, in a portion thereof aligned with each of said at least one axial slot in the intermediate sleeve, the rubber elastic body having portions for preventing fluid communication between the fluid chambers and the axial cutout;

a sealing rubber layer formed on an outer surface of the intermediate sleeve, the sealing rubber layer being formed integrally with the elastic rubber body, and cut by said axial cutout in a circumferential direction thereof; and the intermediate sleeve being radially inwardly deformed by a force applied by the outer sleeve, whereby the elastic rubber body and the sealing rubber layer concurrently are radially inwardly pre-compressed.

2. A fluid-filled elastic bushing according to claim 1, wherein said plurality of windows consist of a pair of windows formed in diametrically opposite portions of the intermediate sleeve, while said at least one axial slot consists of one axial slot which is disposed intermediate between the pair of windows in the circumferential direction of the intermediate sleeve.

3. A fluid-filled elastic bushing according to claim 2, wherein said one axial slot is spaced about 90 degrees from the pair of windows in the circumferential direction.

4. A fluid-filled elastic bushing according to claim 1, further comprising a stopper block fixedly mounted on the inner sleeve such that opposite end portions of the stopper block project in the fluid chambers, the inner sleeve and the stopper block cooperate with each other to define orifice means for fluid communication between the fluid chambers.

5. A fluid-filled elastic bushing according to claim 1, wherein said plurality of windows are formed in axially intermediate portion of the intermediate sleeve, the sealing rubber layer including sealing lips formed in alignment with axial end portions of the intermediate sleeve.

* * * * *